Oct. 22, 1935.   R. J. JAUCH   2,018,130
CHECK VALVE
Filed Sept. 18, 1933
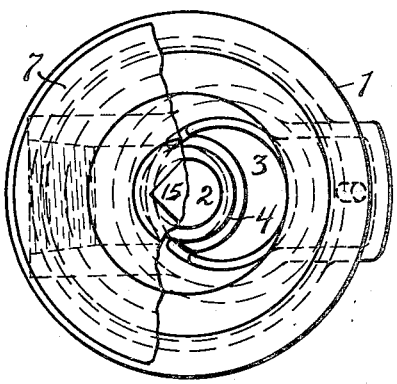
Fig. 1.
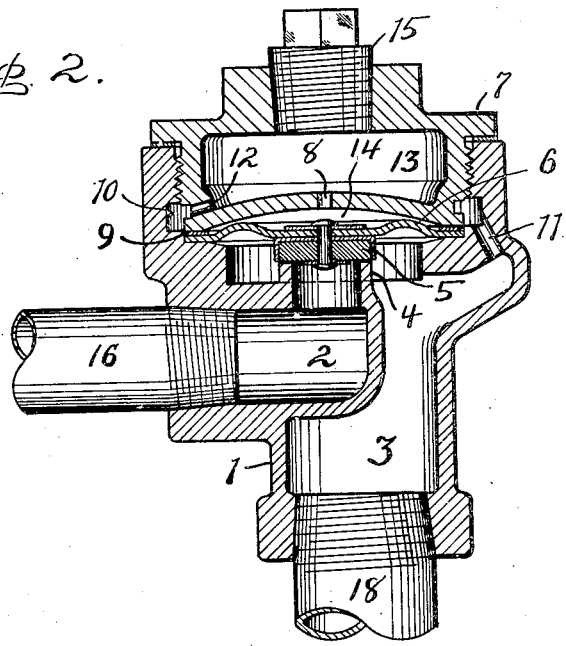
Fig. 2.
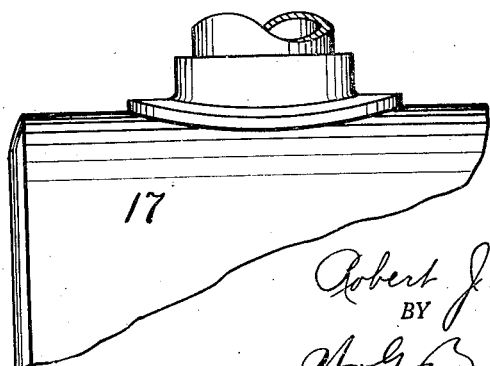
INVENTOR.
Robert J. Jauch.
BY
A. G. Burns ATTORNEY.

Patented Oct. 22, 1935

2,018,130

UNITED STATES PATENT OFFICE 2,018,130

CHECK VALVE

Robert J. Jauch, Fort Wayne, Ind.

Application September 18, 1933, Serial No. 689,847

1 Claim. (Cl. 251—127)

This invention relates to improvements in check valves, and one of the objects thereof is to afford an automatic sensitively operating means for preventing backflow of fluid therethrough as the fluid is supplied under pressure from a source to a place for storage or subsequent use. Another object is to provide a check-valve that operates automatically and freely without chattering irrespective of variations in the volume of fluid passing therethrough or the regularity of its flow. Other objects and advantages of the invention will appear in the following description.

An illustrative embodiment of the invention is shown in the accompanying drawing, in which:—

Fig. 1 is a top plan view of a structure in which the invention is embodied, a portion thereof being cut away; and Fig. 2 is an elevation in section projected from Fig. 1 and including a fragmentary illustration of a storage tank.

The illustrative embodiment of the invention consists of a valve body 1 having antero and postern chambers 2 and 3 respectively and provided with a spout 4 that terminates within the chamber 3 and through which communication occurs between said chambers. The top of the spout is dressed to form a valve seat for a valve 5 that is attached to and held in operative position by a flexible diaphragm 6 located in the body 1 that is secured in place therein by a chambered cap 7 removably secured in said body.

The end of the cap 7 that extends into the body 1 is concave and has a perforation 8 therein for the passage of air therethrough. The cap secures the diaphragm 6 in place, and preferably there is provided a gasket 9 to insure a tight joint between the cap, diaphragm and body. When the diaphragm is thus positioned the valve 5 rests on the spout so that communication between the antero and postern chambers normally is closed.

The body 1 has an annular passageway 10 therein and also a duct 11 connecting said passageway with the postern chamber, and the cap has one or more ducts 12 affording communication between said passageway and the chamber 13 in the cap whereby communication is maintained constantly between the postern chamber and the space 14 through the ducts 11 and 12 and the perforation 8.

The top of the cap 7 is closed by means of a screw plug 15 which may, if so desired, be replaced by a pressure gauge (not shown) whereby pressure within the postern chamber and the storage tank may be ascertained.

In use, the antero chamber is connected with the discharge pipe 16 of an air compressor (not shown) or other suitable source of fluid under pressure, and the postern chamber has communication with a storage tank 17 through a suitable connection 18 so that fluid supplied to the antero chamber passes the valve 5, through the postern chamber, and into the storage tank in which it accumulates, causing rise of pressure therein and corresponding pressure in the space 14 between the lower end of the cap and the diaphragm. Also, the pressure in the storage tank and the postern chamber exerts force against the bottom of the diaphragm to a material extent which is counterbalanced to a more or less greater extent by the pressure above the diaphragm within the space 14. Thus, due to the difference in the areas of the bottom and top surfaces of the diaphragm that are exposed to the pressure of the fluid in the postern chamber and the space 14, the valve 5 is held by the diaphragm in closed position upon the spout until the pressure within the antero chamber is raised by action of said air compressor beyond that accumulated in the storage tank sufficiently to lift the valve in opposition to the air pressure exerted upon the top of the diaphragm.

Under normal operating conditions the flow of liquid from the antero to the postern chamber is without material restraint as the valve is lifted automatically without resistance other than that occasioned by its own weight and that necessary to flex the diaphragm. The concave face of the lower end of the cap is disposed in such proximity to the diaphragm as to definitely limit movement thereof when the valve is fully opened and thus prevent rupture of the diaphragm by any sudden or excessive pressure of fluid in the antero chamber.

A salient feature of the invention lies in the provision wherein the valve that controls passage of fluid through the spout from the antero chamber into the postern chamber through the medium of the diaphragm is influenced automatically in its actions substantially by relative variations of fluid pressure within said chambers.

I claim:—

A check-valve structure having a body provided with antero and postern chambers and a spout through which said chambers have communication and constituting the sole outlet from said antero chamber, a diaphragm disposed in said body, a valve attached to said diaphragm normally closing said spout, and a chambered cap in said body securing the diaphragm in place, one end of which is shaped to limit movement of the diaphragm, and provided with a perforation therein to permit passage of fluid therethrough to create pressure on the top of said diaphragm whereby to close the valve, there being a passageway and ducts in said body and cap respectively to permit flow of fluid therethrough from the postern chamber to counterbalance said diaphragm.

ROBERT J. JAUCH.